United States Patent [19]
Harrison

[11] Patent Number: 4,928,797
[45] Date of Patent: May 29, 1990

[54] BRAKE

[75] Inventor: Anthony W. Harrison, Birmingham, Great Britain

[73] Assignee: Lucas Industries Public Limited Company, Birmingham, England

[21] Appl. No.: 272,385

[22] Filed: Nov. 17, 1988

[30] Foreign Application Priority Data

Jan. 19, 1988 [GB] United Kingdom ............... 8801089

[51] Int. Cl.$^5$ ............................................. F16D 65/27
[52] U.S. Cl. ................................... 188/156; 188/365
[58] Field of Search ............... 188/79, 156, 157, 158, 188/162, 365

[56] References Cited

U.S. PATENT DOCUMENTS

| | | | |
|---|---|---|---|
| 2,324,979 | 7/1943 | Hatch | 188/365 |
| 3,790,225 | 2/1974 | Wehde | 188/162 X |
| 4,130,188 | 12/1978 | Askew | 188/156 X |
| 4,327,414 | 4/1982 | Klein | 188/162 X |

*Primary Examiner*—Duane A. Reger
*Attorney, Agent, or Firm*—Fleit, Jacobson, Cohn, Price, Holman & Stern

[57] ABSTRACT

An internal shoe drum brake has a body (1) carrying a plurality of circumferentially spaced friction elements (2) movable into engagement with a rotatable drum (3) by a hydraulic system including an actuator (5) having a pressure-applying cylinder (2) in which a pressure-generating piston (21) is driven by an electrical stepper motor (28), slave cylinders (4) which actuate the friction elements, and internal ducts (7, 8) for transmitting pressure from piston (21) to slave cylinders (4).

20 Claims, 4 Drawing Sheets

BRAKE

BACKGROUND OF THE INVENTION

This invention relates to a brake of the general kind in which a friction element is movable by hydraulic actuating means into braking engagement with a rotary braking member.

Conventional hydraulically operated braking systems have hitherto been considered unsuitable for operation as parking brakes because the possibility of leaks, albeit minute, occurring during the parking brake mode leads to a risk of the braking force becoming insufficient to maintain a vehicle stationary, particularly on an incline. Because of the possibly disastrous consequences of this, especially with an unattended vehicle, hydraulically operated brakes usually incorporate an independent mechanical linkage for parking brake purposes, in order to provide the necessary degree of security.

BRIEF SUMMARY OF THE INVENTION

An object of the present invention is to provide a brake of the aforesaid general kind which is of simple and robust construction and which permits an adequate and reliable parking brake function to be obtained by way of the hydraulic actuating means without recourse to an auxiliary mechanical linkage.

According to the invention, a brake comprises a housing carrying a friction element, a slave cylinder carried by the housing and operable to engage said friction element with a member to be braked, and an actuator having an hydraulic pressure-generating device connected to the slave cylinder, said device being driven by an electrical stepper motor to produce a brake-applying force in both dynamic and static braking modes.

In one convenient arrangement, a plurality of slave cylinders, which may conveniently be defined by the housing, are pressurized simultaneously by a single pressure-generating device to operate respective friction elements.

BRIEF DESCRIPTION OF THE DRAWINGS

The invention will now be described, by way of example, with reference to the accompanying drawings wherein.

DETAILED DESCRIPTION

Figure 1:
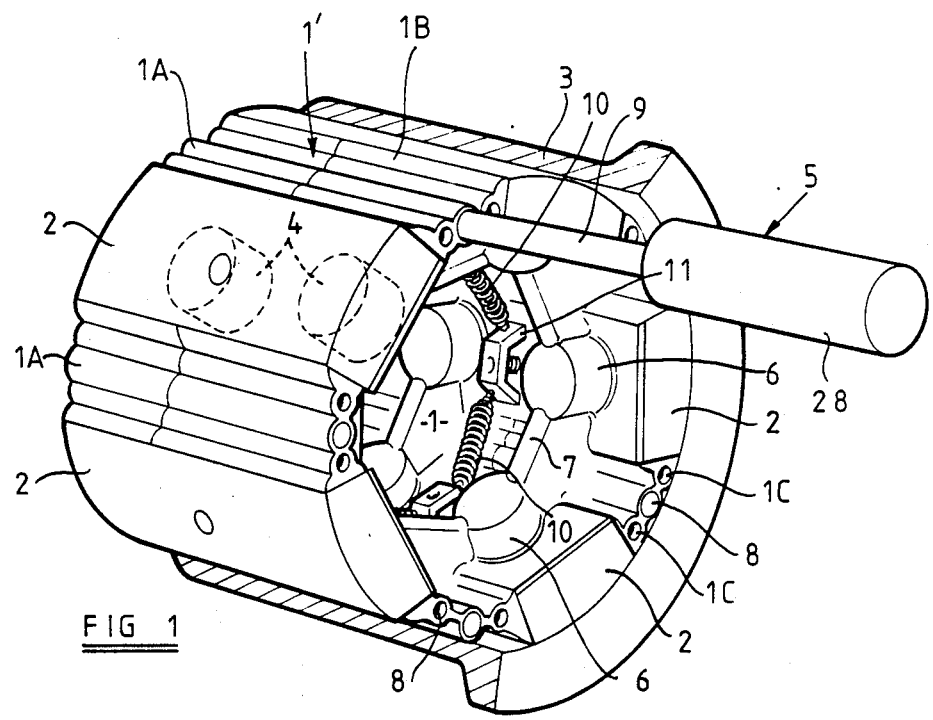
FIG. 1 is a perspective view, partly in cross-section, of one form of the brake of the invention.
Figure 2:
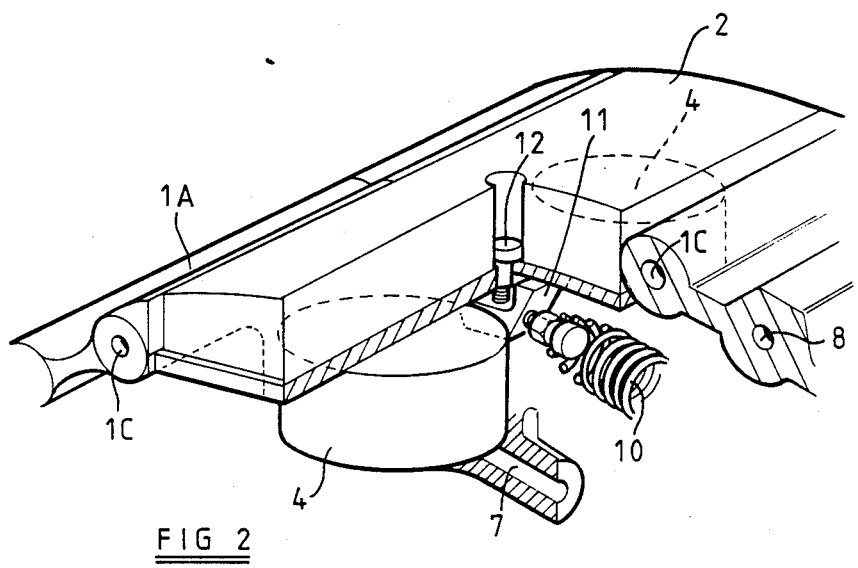
FIG. 2 is an enlarged perspective segmented view taken generally perpendicular to FIG. 1.

Referring to FIGS. 1 and 2, these illustrate the brake of the invention in the form of an internal shoe drum brake unit having a relatively fixed generally annular body 1 around which are mounted a plurality of friction elements in the form of brake shoes 2. Five brake shoes 2 are provided in the illustrated embodiment, being equi-angularly distributed at 72° intervals around the body 1, adjacent shoes being separated by intervening portions 1' of the body against which the shoes bear in torque-reacting relationship. The body is divided longitudinally into two parts 1A, 1B which are co-axially juxtaposed and clamped together by bolts (not shown) passing through holes 1C of the housing so as to extend over the entire length of the assembly.

The body 1 is disposed within a surrounding brake drum 3 against which the shoes 2 are urged into braking engagement by slave pistons 4, actuation of which is effected by an actuator mechanism, indicated generally at 5, which will be described in more detail hereafter. The pistons 4 are housed within respective cylinders 6 defined by and housed within the body 1, the cylinders being interconnected by fluid conduits 7 also defined by the body 1 and connected via other internal conduits 8 to a hydraulic part 9 of the actuator mechanism 5. Each body part 1A, 1B contains an annular set of cylinders 6 and each shoe 2 bridges across axially adjacent pairs of cylinders so as to be actuated by a pair of pistons 4. A shoe return force is provided by a plurality of return springs 10 arranged in a generally circular formation, each adjacent pair of spring ends being secured to a yoke or similar device 11 fixed to the underside of a friction element 2 by one or more securing screws 12 (FIG. 2). Fixed supports (not shown) for the yokes 11 would normally be provided radially inwardly of the latter as part of the housing 1 and serve to prevent inward movement of the yokes 11 when the shoes are detached therefrom for servicing or replacement. This enables the springs 10 to be maintained in tension and the yokes 11 to be generally retained in their positions of use in order to facilitate re-assembly of the friction elements or the fitting of new ones.

Figure 4:
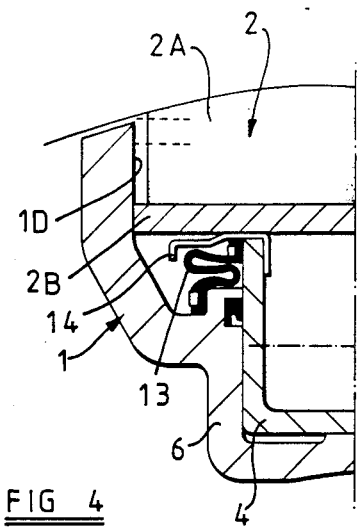
FIG. 4 is an enlarged segmented cross-sectional detail of part of the brake of FIGS. 1 to 3.

As can be seen from FIG. 4, each friction element 2 includes a friction lining 2A conventionally bonded to a backing plate 2B which engages a torque-reacting surface 1D on an adjacent portion of the housing 1. A protective boot 13 is anchored at its respective ends to the piston 4 and housing 1 to protect the vulnerable exposed end of the piston projecting from the cylinder 6 and a heat shield 14 carried by the piston protects the boot from heat generated in the friction element 2 during braking.

Figure 3:
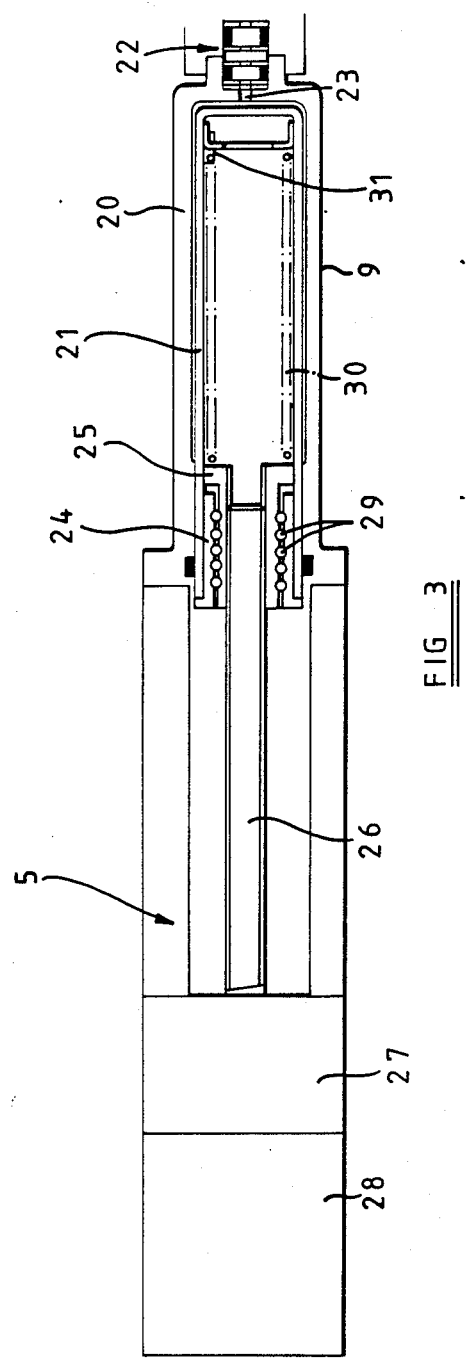
FIG. 3 is an enlarged view, partly in cross-section, of part of the brake of FIGS. 1 and 2.

The actuator 5 is illustrated in more detail in FIG. 3. The actuator comprises a hollow cylindrical elongate body 20 within which slides a hollow piston 21. The body 20 is connected to the brake body 1 by means of a sealing connector 22 which provides communication between an outlet port 23 of the actuator body and the internal passages (7, 8) of the brake body 1 and also permits a degree of articulation between the actuator and brake body to accommodate axle deflection, in use. The piston 21 is mounted on an outer race member 24 of a ball screw mechanism, the inner part 25 of which constitutes an internally threaded nut engaged by an elongate screw 26 driven through a gear box 27 by a stepper motor 28, preferably of the switched reluctance type. An array of balls 29 is engaged in opposed helical groove formations formed respectively in the race member 24 and nut 25, the race member 24 being prevented from rotating relative to the motor assembly by means of a sliding key connection (not shown). A torsion spring 30 within the piston 21 has one of its ends anchored at 31 to the piston and its other end anchored to the nut 25. The torsional force applied by the spring 30 to the nut 25 causes the nut to rotate in such a direction as to move it into the piston to the extent allowed by the travel of the balls 29. The lead of the screw 26 is the same as that of the grooves containing the balls 29 and is also of the same hand.

The brake described above operates as follows. When braking is required, the stepper motor 28 is energized under the action of an electronic controller (not shown) which causes the stepper motor to rotate through a desired number of increments from a first known position memorized by the controller to a second position. This rotates the screw 26 in a direction such as to move the piston 21 to the right, as seen in the drawing, thereby to expel fluid from the cylinder 20 into the slave cylinders 6 via passages 7, 8, in order to apply the shoes 2 against the drum 3. During the initial take up of braking clearances, the torque developed in the thread between the screw 26 and nut 25 will be small enough to be overcome by the spring 30, so that all the rotational movement of the screw 26 will be used to move the piston in the brake-applying direction, no relative movement occurring between the ball race 24 and nut 25. When braking load is developed, upon engagement of the friction elements 2 with the brake drum 3, the increase in thread frictional torque thereby generated will effectively immobilize the nut 25 on the screw 26 and the torsional force of the spring 30 will be overcome, enabling the nut 25 now to drive the race 24 and attached piston 21 via the very efficient ball screw thread, thereby maximizing the effective driving force of the motor 28. Since the loaded travel of the piston is always short, the length of the ball mechanism 24, 25, 29 can be minimized with attendant cost reduction, while retaining the significant advantage of such a mechanism.

In the event that the brake is applied in a parking mode, the system pressure can be monitored by a suitable sensor so that any pressure variation, due to expansion or contraction of mechanical components, for example, or of the hydraulic fluid, can be corrected by the controller operating the motor through the required number of increments to restore the pressure to the required level. The use in the brake actuator of a stepper motor, of which the rotational position can be memorized by the controller, enables a very sensitive response to be obtained which permits accurate control of the braking pressure during both dynamic and static braking, enabling a hydraulic system to be employed for parking purposes.

Figure 5:
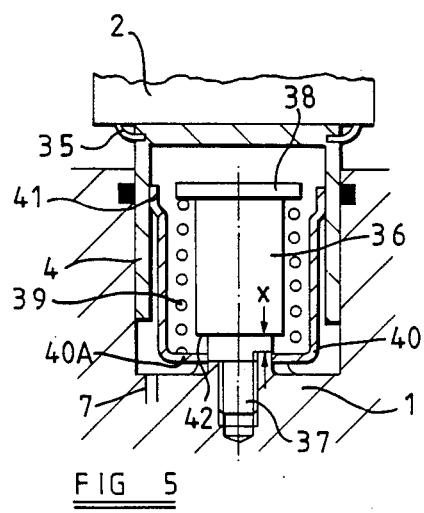
FIGS. 5 and 6 are diagrammatic views illustrating respective friction element control mechanisms.

FIG. 5 illustrates a retraction spring and shake back stop arrangement associated with one of the pistons 4, it being understood that each piston will be of similar construction. The backplate of the friction element 2 associated with the piston 4 is connected axially to the piston by means, illustrated diagrammatically as hooks 35, which ensure that the piston and friction element move as a unit. A spigot 36 extends coaxially within the piston 4 and is rigidly secured to the body 1 by a smaller diameter threaded portion 37 thereof screwed into a complementary aperture of the body. The outer end of the spigot 36 is provided with a radial flange 38 and a return spring 39 acts between this flange and the base 40A of a generally cup-shaped element 40 which is generally of slightly smaller diameter than the internal dimension of the piston, but has a flared end portion 41 which is press-fitted within the piston so as to be a tight sliding fit therein, providing sufficient frictional force to resist the action of the spring 39 thereon. The spigot 36 is provided with a shoulder 42 at a location remote from the flange 38 and, in the unworn condition of the brake, a clearance X exists between the shoulder 42 and the base 40A of the device 40. This clearance sets the maximum shoe to drum working clearance for normal brake operation.

Figure 6:
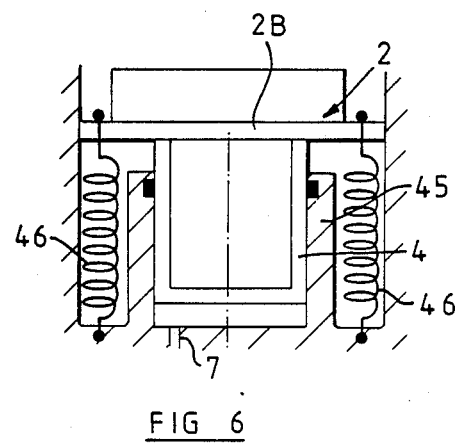

When the piston 4 is actuated in the unworn condition of the brake, the piston and cup 40 move together and the piston and attached friction element will be returned by the spring 39 to the illustrated position, upon removal of the actuating pressure As wear of the friction element takes place, piston movement greater than the distance X will be required and the actuating pressure on the piston is able to overcome the frictional grip of the cup portion 41 on the piston to permit the piston to move to a new adjusted position FIG. 6 is a diagrammatic illustration of an alternative return spring arrangement. In this embodiment, the piston 4 slides within a hollow boss 45 of the body 1 and a plurality of return springs 46 are distributed around the piston 4 and connected between the back plate 2B of the friction element 2 and the body 1 to provide a return force for the friction element upon release of actuating pressure. The rate of the springs is chosen so as to be sufficient to mask the effect of piston and pad weight and inevitable differences in seal friction for the retracted positions of the pistons which face in different directions.

Figure 7:
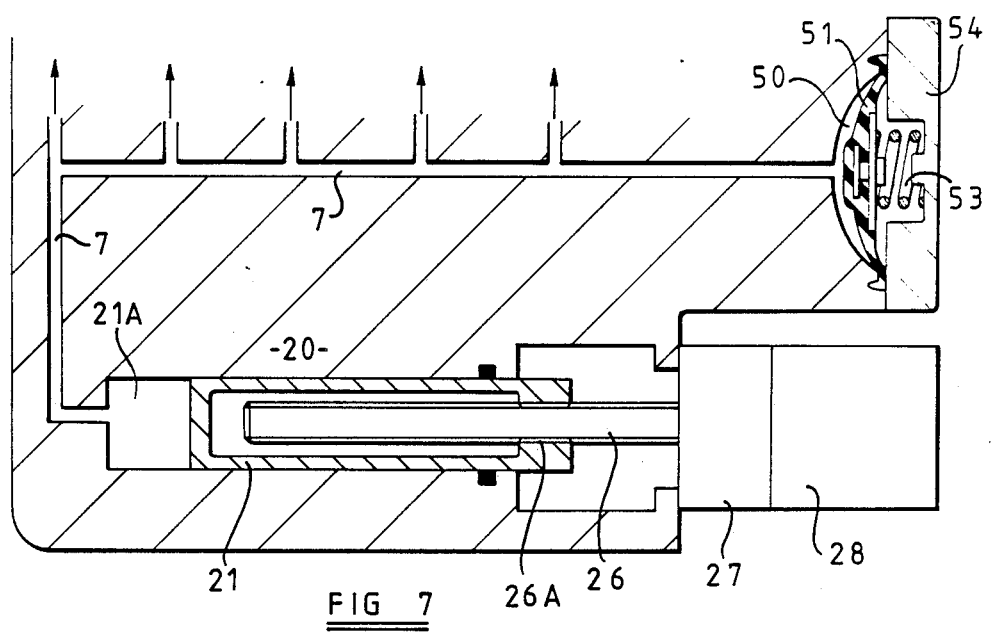
FIG. 7 is a diagrammatic illustration of an alternative embodiment of actuating mechanism for use in the brake of the invention.

A modified arrangement of the brake of the invention is illustrated diagrammatically in FIG. 7. This again employs an actuator having a stepper motor 28 driving a screw 26 through a gear box 27, the screw being threadedly connected at 26A to a piston 21 which is thereby driven axially within a cylinder 20 by rotation of the motor 28. Fluid is expelled from a chamber 21A of the cylinder, upon forward movement of the piston 21, into a hydraulic line 7 which is branched to supply a plurality of pistons arranged in a similar manner to those of FIG. 1. The line 7 also supplies a chamber 50, partly defined by a diaphragm 51 loaded at its side remote from the line 7 by a spring 53 reacting against a fixed base 54.

The spring-loaded diaphragm is movable against the action of the spring 53 in response to expansion of fluid in the system and returned by the spring upon fluid contraction, the diaphragm maintaining a minimum threshold pressure in the system. Fluid contraction can thus occur without air being drawn into the system. This arrangement provides a compensation means of simple and convenient form which performs a function normally effected by the fluid reservoir of a conventional system. It will be understood that the actuator of FIG. 7 may be replaced by that of FIG. 3, or by any other convenient alternative.

It will be understood that the brake of the invention may be provided with two or more stepper motor-powered actuators to enable split and/or dual braking to be effected. The or each actuator may, for convenience, be housed in a hollow axle casing of a non-driven axle which provides a protected environment and leads to a relatively compact arrangement by making use of otherwise possibly redundant space.

The illustrated forms of the invention can be seen to be advantageous in that the brake is completely self-contained and may be pre-filled with fluid prior to installation. The only connection then required to the brake, once in its position of use on a vehicle, is an electrical one to power the stepper motor, and this facilitates removal of the brake for servicing and replacement.

I claim:

1. A brake comprising:
   a housing;
   a friction element supported on said housing;
   slave cylinder-piston means supported by said housing in engagement with said friction element and operable to engage said friction element with a member to be braked;
   an actuator for operating said slave cylinder-piston means having a hydraulic pressure generating device connected to said slave cylinder-piston means for producing a brake-applying force in both dynamic and static braking modes 2; and
   an electrical stepper motor for driving said hydraulic pressure generating device, said hydraulic pressure generating device comprising,
   a pressure generating cylinder,
   a pressure generating piston axially reciprocable in said pressure generating cylinder,
   a screw rotatable by said stepper motor;
   a helical ball race connected to said pressure generating piston,
   a nut mounted in said helical ball race and engaged with said screw, and,
   a torsion spring rotationally restraining said nut, so that said torsion spring restrains said nut against rotation during initial take up of brake clearances upon actuation of said pressure generating piston, but yields upon application of a predetermined braking load applied by said friction element on the member to be braked causing said nut to rotate in said helical ball race to increase the braking load.

2. A brake comprising:
   a housing;
   a plurality of friction elements supported on said housing;
   a plurality of slave cylinder-piston means supported by said housing in engagement with said friction elements and operable to engage said friction elements with a member to be braked;
   an actuator comprising a single hydraulic pressure generating device connected to said plurality of slave cylinder-piston means for producing brake applying force in both dynamic and static braking modes;
   an electrical stepper motor for driving said single hydraulic pressure generating device;
   a fluid pressure chamber connected in parallel with said plurality of salve cylinder-piston means; and
   a spring-loaded diaphragm in said fluid pressure chamber adapted to yield against the force of the spring thereof upon expansion of fluid in engagement therewith and to move in the opposite direction upon fluid contraction.

3. A self-contained brake assembly comprising:
   a housing;
   at least one friction element supported on said housing;
   at least one slave cylinder-piston means supported on said housing and operable to engage said at least one friction element with a member to be braked;
   fluid inlet means on said housing;
   conduits extending internally in said housing and connecting said fluid inlet means to said at least one slave-cylinder-piston means;
   an actuator on said housing comprising pressure generating means, stepper motor means drivingly connected to said pressure generating means and fluid outlet means connected to said pressure generating means and disposed adjacent said fluid inlet means for conducting fluid from said pressure generating means directly into said fluid inlet means, so that operation of said stepper motor produces fluid pressure by said pressure generating means for actuating said at least one slave cylinder-piston means to produce brake-applying pressure in both dynamic and static braking modes; and
   pressure threshold means connected to said at least one slave cylinder-piston means for maintaining positive threshold fluid pressure irrespective of volumetric changes in fluid in the assembly.

4. A brake as claimed in claim 3 wherein: the cylinder of said at least one slave cylinder piston means is defined by said housing.

5. A brake as claimed in claim 3 wherein: said pressure generating means comprises a cylinder, a piston reciprocable in said cylinder, and a rotary to linear motion converter operatively connecting said stepper motor to said pressure generating piston.

6. A brake as claimed in claim 3 wherein: a plurality of friction elements are provided, a plurality of slave cylinder-piston means are provided to actuate respective ones of said plurality of friction elements, and said plurality of slave cylinder-piston means are actuated by a single pressure generating means.

7. A brake as claimed in claim 3 wherein: said housing comprises a plurality of axially conjoined parts, at least one slave cylinder-piston means is provided on each part, and said at least one friction element bridges said parts and is actuated simultaneously by said cylinder-piston means of each housing part.

8. A brake as claimed in claim 3 wherein: said housing has an annular form, a plurality of friction elements are provided radially movable on said housing and a plurality of slave cylinder-piston means are provided circumferentially spaced within said plurality of friction elements for displacing said friction elements radially outwardly into engagement with the member to be braked.

9. A brake as claimed in claim 5 wherein: said housing has a central axis, and said pressure generating piston and cylinder and stepper motor are longitudinally aligned and extend generally axially relative to said housing.

10. A brake as claimed in claim 5 wherein: said rotary to linear motion converter comprises a screw thread coupling having one part rotatable by said motor to cause axial movement of another part and thereby of the piston.

11. A brake as claimed in claim 8 wherein: said friction elements are interconnected by a plurality of circumferentially extending springs each connecting an adjacent pair of friction elements.

12. A brake as claimed in claim 1 wherein: each friction element has a yoke secured releasably thereto, respective adjacent springs are secured to either side of each yoke, and means are provided to support said yokes when they are disconnected from said friction elements for enabling said friction elements to be removed independently of said springs.

13. A brake as claimed in claim 3 wherein: said stepper motor comprises a switched reluctance type motor. pressure irrespective of volumetric changes in fluid in the assembly.

14. A brake as claimed in claim 1 wherein: the cylinder of said at least one slave cylinder-piston means is defined by said housing.

15. A brake as claimed in claim 2 wherein: the cylinder of said at least one slave cylinder-piston means is defined by said housing.

16. A brake as claimed in claim 5 wherein: the cylinder of said at least one slave cylinder piston means is defined by said housing.

17. A brake as claimed in claim 1 wherein: a plurality of friction elements are provided, a plurality of slave cylinder-piston means are provided to actuate respective ones of said plurality of friction elements, and said plurality of slave cylinder-piston means are actuated by a single pressure-generating means.

18. A brake as claimed in claim 2 wherein: a plurality of friction elements are provided, a plurality of slave cylinder-piston means are provided to actuate respective ones of said plurality of friction elements, and said plurality of slave cylinder-piston means are actuated by a single pressure generating means.

19. A brake as claimed in claim 8 wherein: said housing comprises a plurality of axially conjoined parts, at least one slave cylinder-piston means is provided on each part, and said at least one friction element bridges said parts and is actuated simultaneously by said cylinder piston means of each housing part.

20. A brake as claimed in claim 8 wherein: said pressure generating means comprises a cylinder, a piston reciprocable in said cylinder, and a rotary to linear motion converter operatively connecting said stepper motor to said pressure generating piston.

* * * * *